Patented Oct. 31, 1944

2,361,586

UNITED STATES PATENT OFFICE 2,361,586

PRODUCTION OF SIRUP FROM FRUIT JUICE

Sam Avis, Chicago, Ill.

No Drawing. Application October 24, 1942, Serial No. 463,209

4 Claims. (Cl. 99—205)

The present invention relates generally to the production of sirup from fruit juice. More particularly the invention relates to the production of that type of sirup which possesses none of the ferment organisms of the juice from which it is made and serves, because of its inherent sweetness or saccharine properties, as a medium for preserving food products or making food products more palatable.

As evidenced by United States Patent No. 1,381,613 granted to me on June 14, 1921, it has heretofore been proposed to produce sirup from fruit juice by first introducing a small quantity of whiting (calcium carbonate) into the fruit juice and then thoroughly agitating the mixture in order to cause the whiting to combine with and neutralize the ferment organisms in the juice, then allowing the mixture to stand for a sufficient length of time to permit settling of the whiting and the ferment organisms that are combined therewith, then decanting the supernatant liquor and finally concentrating such liquor by periodically boiling it. In practice it has been found that sirup made in accordance with the aforementioned process, although palatable, is subject to certain objections. In the first place such sirup does not possess the desired sweetness; secondly the sirup is not a stable food product by reason of the fact that it has a marked tendency to crystallize; and thirdly, the sirup is slightly cloudy in appearance as a result of the fact that it is practically impossible fully or completely to remove the whiting which is employed to neutralize the ferment organisms.

The object of this invention is the provision of a sirup producing process which is an improvement upon that of the aforementioned United States Letters Patent and yields a sirup which is sweeter and essentially clearer and has no tendency whatsoever to crystallize when allowed to stand for a comparatively long period of time or in response to temperature changes.

The invention consists in the process which is hereinafter described in detail and is more particularly defined by claims at the conclusion hereof.

In carrying out the improved process any type of fruit juice may be employed, for example, the juice of apples, grapes, peaches, plums, oranges, cherries, pears, or apricots may be used. Preferably the juice is permitted to stand in order to settle out any foreign particles or impurities. After removal of such particles or impurities small quantities of whiting and magnesium carbonate are introduced into the juice and the mixture is thoroughly stirred or agitated in any suitable manner in order intimately to mix the whiting and magnesium carbonate with the juice. Between 3 and 4 ounces of whiting and between 1½ to 2 ounces of magnesium carbonate are used with each gallon of juice. During the stirring or agitating operation the whiting component combines with and neutralizes the ferment organisms in the juice. The magnesium carbonate component assists the whiting in neutralizing the ferment organisms. The stirring or agitating operation is carried out for 5 to 10 minutes and then the mixture is permitted to stand for a period of 30 minutes. While the mixture is permitted to stand the whiting and magnesium carbonate settle to the bottom of the receptacle in which the mixture is placed. After substantially all particles of whiting and magnesium carbonate settle to the bottom of the receptacle the supernatant liquor, that is, the juice which is freed of its ferment organisms is decanted. Thereafter the decanted liquor or juice is reduced to sirup form by a single boiling operation. If the juice of apples is employed as the base component the juice, after being subjected to the action of the whiting and magnesium carbonate, is concentrated from a gallon to approximately one quart. The resultant sirup possesses exceptionally high sweetness or saccharine properties and is characterized by the fact that it is clear and not subject to crystallization. The magnesium carbonate which is employed in the process has a fourfold purpose in that it serves—first, to expedite settling of the whiting with the combined and neutralized ferment organisms; second, to reduce the time necessary to concentrate or reduce the juice to sirup form; third, to increase the sweetness of the resultant sirup; and fourth, to prevent the sirup from crystallizing. The sirup which results from the aforementioned process has many capabilities of use and may be used either as a medium for rendering other food products more palatable or as a preservative or sugar agent in connection with the making of jelly or jam.

The invention is not to be understood as restricted to the precise details or proportions set forth since these may be modified within the scope of the appended claims without departing from the spirit and scope of the invention.

Having thus described the invention what I claim as new and desire to secure by Letters Patent is:

1. That improvement in the production of sirup from fruit juice which comprises introducing small quantities of whiting and magnesium carbonate into the juice and subjecting the juice to agitation in order intimately to mix the whiting and magnesium carbonate therewith, then removing from the juice the whiting and magnesium carbonate and all particles or matter combined therewith, and finally concentrating to sirup form the juice obtained after the separating step.

2. That improvement in the production of sirup from fruit juice which comprises introducing a small quantity of whiting and a lesser quantity of magnesium carbonate into the juice and subjecting the juice to agitation in order intimately to mix the whiting and magnesium carbonate therewith, then removing from the juice the whiting and magnesium carbonate and all particles or matter combined therewith, and finally concentrating to sirup form the juice obtained after the separating step.

3. That improvement in the production of sirup from fruit juice which comprises introducing small quantities of whiting and magnesium carbonate into the juice and subjecting the juice to agitation in order intimately to mix the whiting and magnesium carbonate therewith, then allowing the mixture to stand in order to settle out the whiting and magnesium carbonate and other matter combined therewith, then decanting the supernatant liquor so as to leave out the sediment, and finally concentrating the liquor to sirup form.

4. That improvement in the production of sirup from fruit juice which comprises introducing into the juice whiting and magnesium carbonate in the proportion of between 3 and 4 ounces of whiting and between 1½ and 2 ounces of magnesium carbonate to each gallon of juice, then agitating the mixture in order thoroughly to mix the whiting and magnesium carbonate with the juice, then removing from the juice the whiting and magnesium carbonate and all particles or matter combined therewith, and finally concentrating to sirup form the juice obtained after the separating step.

SAM AVIS.